(12) United States Patent
Hasegawa

(10) Patent No.: US 6,249,684 B1
(45) Date of Patent: Jun. 19, 2001

(54) WIRELESS TELEPHONE WITH AN ERGONOMIC GRIP OR HANDLE

(75) Inventor: Yutaka Hasegawa, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/143,789

(22) Filed: Aug. 31, 1998

(51) Int. Cl.$^7$ .................................................. H04M 11/00
(52) U.S. Cl. ........................... 455/550; 455/90; 455/575; 379/433; 379/428
(58) Field of Search .............................. 455/89, 90, 128, 455/558, 575, 590; 379/56, 58, 419, 428, 433, 440

(56) References Cited

U.S. PATENT DOCUMENTS

| | | | | |
|---|---|---|---|---|
| 5,259,019 | * | 11/1993 | Stilley ....................................... | 379/58 |
| 5,327,584 | * | 7/1994 | Adachi et al. ........................... | 455/89 |
| 5,507,013 | * | 4/1996 | Weadon et al. ......................... | 455/90 |
| 5,640,690 | * | 6/1997 | Kudrna .................................... | 455/89 |
| 5,649,306 | * | 7/1997 | Vannatta et al. ....................... | 455/575 |
| 5,678,206 | * | 10/1997 | Ishii ........................................ | 455/90 |
| 5,711,013 | * | 1/1998 | Collett et al. .......................... | 455/558 |
| 5,896,277 | * | 4/1999 | Leon et al. .............................. | 361/814 |

\* cited by examiner

*Primary Examiner*—Thanh Cong Le
*Assistant Examiner*—Pablo Tran
(74) *Attorney, Agent, or Firm*—Ronald C. Card

(57) ABSTRACT

An improved wireless telephone including a main body having a generally rectangular shape, the main body further including a first surface and a first width. The first surface having disposed thereon a plurality of input data entry keys, a visual display, a plurality of function entry keys, and a microphone. A speaker is mechanically coupled to the main body. A means for grasping the wireless telephone or a grasping device is coupled to the main body. The means for grasping or the grasping device also includes a first surface and a second surface, the first surface having an undulating surface including a plurality of alternately disposed flat and concave portions, and the second surface being generally convex or curved. The means for grasping or the grasping device is rotatably connected to the main body, is aligned along or parallel to a longitudinal axis of the wireless telephone, and further includes a second width which is narrower than the first width. The means for grasping or the grasping device is attached to the wireless telephone in such a manner such that a wrist of a user of the wireless telephone is maintained in a neutral position while the wireless telephone is operated as a telephone. The means for grasping or grasping device may have, in alternative embodiments, a generally rectangular cross-section shape, a generally cylindrical cross-section shape, or a generally oval cross-section shape.

15 Claims, 4 Drawing Sheets

WIRELESS TELEPHONE WITH AN ERGONOMIC GRIP OR HANDLE

BACKGROUND

1. Field of the Invention

This invention relates generally to the field of communication devices. More particularly, this invention relates to an improved telephone device including an improved and more ergonomic grip or handle.

2. Background of the Invention

Early wireless telephones including cellular telephones, satellite phones, CDMA or PCS type phones, and the like, included large housings which contained large and heavy batteries and extensive electronic circuitry. The weight and size of such wireless telephones have steadily decreased over the years. This weight and size decrease results in part, from the integration of electronic functions and operations of a wireless telephone into semiconductor integrated devices such as digital signal processors. Also, smaller more powerful batteries have been developed and utilized in such telephones.

In spite of their smaller size, many wireless telephones are still too large to be carried in a coat or shirt pocket of a user. The user, therefore, must either carry the telephone in a bag or brief case, carry the telephone in his hand, or carry the telephone in a case which is attached to, for example, an article of clothing such as a belt or pants. However, these methods of carrying such a telephone are not as convenient as carrying it in the user's coat or shirt pocket. Thus, wireless telephone manufacturers continue to make their telephones smaller and easier to carry.

Form and function requirements related to the operation of wireless telephones limit how small such a telephone can be. For example, one such limiting operational requirement is that such a telephone must be long enough so that a user's mouth and ear can be simultaneously disposed proximate to a microphone and a speaker, respectively. Another limiting operational requirement is that such a telephone must be large enough so that its display and its keypad are large enough to allow a user to efficiently perform operations and/or enter or read alphanumeric data.

In order to make wireless telephones smaller, such telephones of the prior art are constructed with panels that are moveable so as to configure a cellular telephone from a storage configuration to an operational configuration, and vice versa. More specifically, a wireless telephone is constructed such that the interface devices (e.g., speaker, microphone, display, and keypad) are disposed on one or more moveable panels which are pivotally joined or slidably attached to a main body. When such a telephone is to be stored, the moveable panels are folded onto, slid over, or slide into the main body thereby placing it into the storage configuration which is small enough to fit into a coat or shirt pocket of a user. When the wireless telephone is to be operated as a telephone, the moveable panels are folded out from or slide out of the main body thereby placing it into the operational configuration that is large enough to permit a user to efficiently use the interface devices of the telephone.

FIG. 1 schematically depicts a user 10 grasping a wireless telephone 12 with a hand 11. When using the telephone 12 as a telephone (i.e., simultaneously disposing the speaker and the microphone of the telephone 12 proximate to the ear and mouth, respectively, of the user 10), the user 10 generally grasps the telephone 12 along the edges 13 so as to not block the interface devices such as microphone or speaker, or so as not to engage interface devices such as the keypad or function keys. Grasping the telephone in this manner urges the wrist of the user 10 out of its neutral position and rotates the wrist backward into an awkward position causing an uncomfortable flexing in the forearm and tension in the shoulder of the user. When using telephones, keyboards and the like, it is highly desirable to maintain one's wrists in the neutral position so as to relieve stress and tension in one's arms and wrists, thereby reducing fatigue and avoiding physical injury. When the arms of a user are dangled straight down by his side, the user's wrists are straight and disposed in the so called "neutral" position. What is needed, is a wireless telephone which is small enough to slide into a user's coat or shirt pocket, includes adequately sized displays and keypad, and, when used as a telephone, maintains the user's wrist in the neutral position.

SUMMARY OF THE INVENTION

It is an object of the present invention to provide an improved wireless telephone having a small enough form factor to fit into a user's shirt or coat pocket.

It is another object of the present invention to provide an improved wireless telephone having a small form factor and having an adequately sized display and keypad.

It is yet another object of the present invention to provide an improved wireless telephone having a small form factor and capable of being grasped by a hand of a user in such a manner such that a wrist of the user is maintained in a neutral position while the wireless telephone is operated as a telephone.

Briefly, a preferred embodiment of the present invention includes a main body having a generally rectangular shape, the main body further including a first surface and a first width. The first surface having disposed thereon a plurality of input data entry keys, a visual display, a plurality of function entry keys, and a microphone. A speaker is mechanically coupled to the main body. A means for grasping the wireless telephone or a grasping device is coupled to the main body. The means for grasping or the grasping device also includes a first surface and a second surface, the first surface having an undulating surface including a plurality of alternately disposed flat and concave portions, and the second surface being generally convex or curved. The means for grasping or the grasping device is rotatably connected to the main body, is aligned along or parallel to a longitudinal axis of the wireless telephone, and further includes a second width which is narrower than the first width. It is an advantage of the present invention that the means for grasping or the grasping device is attached to the wireless telephone in such a manner such that a wrist of a user of the wireless telephone is maintained in a neutral position while the wireless telephone is operated as a telephone.

In another embodiment of the present invention, a grasping device is coupled to a wireless telephone having a first width, the grasping device including means for grasping the wireless telephone such that a wrist of a user of the wireless telephone, is maintained in a neutral position while the wireless telephone is operated as a telephone. The means for grasping also includes a first surface and a second surface, the first surface having an undulating surface including a plurality of alternately disposed flat and concave portions, and the second surface being generally convex or curved. The means for grasping is rotatably connected to the main body, is aligned along or parallel to a longitudinal axis of the wireless telephone, and further includes a second width which is narrower than the first width. It is an advantage of the present invention that the means for grasping is attached to the wireless telephone in such a manner such that a wrist of a user of the wireless telephone is maintained in a neutral position while the wireless telephone is operated as a telephone.

In still other embodiments of the present invention, the means for grasping or grasping device may have a generally rectangular cross-section shape, a generally cylindrical cross-section shape, or a generally oval cross-section shape.

These and other objects and advantages of the present invention will become apparent to those skilled in the art upon consideration of the following description of the invention.

DETAILED DESCRIPTION OF THE INVENTION

Figure 1:
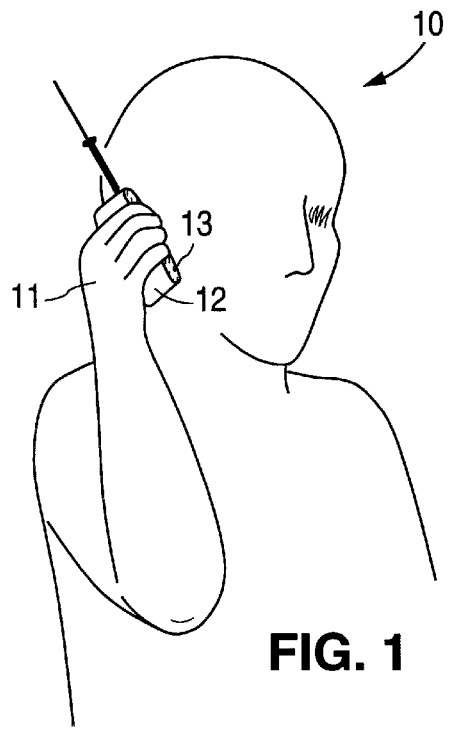
FIG. 1 schematically illustrates a user grasping a wireless telephone of the prior art.

While this invention is susceptible of embodiments in many different forms, there will be shown in the drawing and will herein be described in detail specific embodiments, with the understanding that the present disclosure is to be considered as an example of the principles of the invention and not intended to limited the invention to the specific embodiment shown and described.

Figure 2:
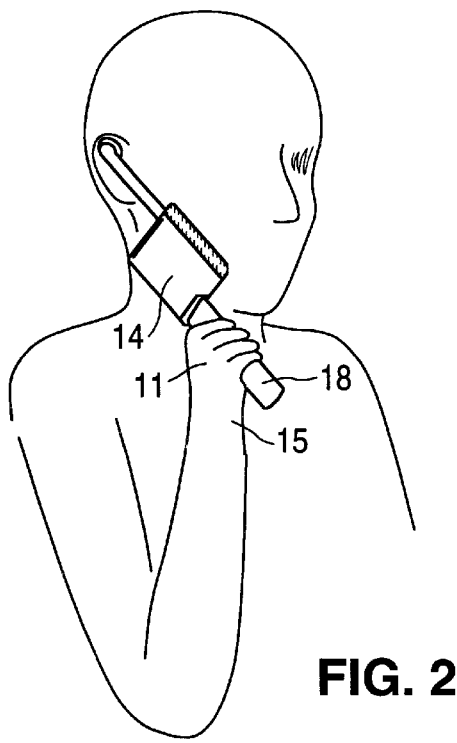
FIG. 2 schematically depicts a user grasping a wireless telephone having an embodiment of the present invention.

Referring now to FIG. 2 which depicts a user 10 grasping a wireless telephone 12 having an embodiment of the present invention. The hand 11 of a user 10 is illustrated as holding onto a grasping means or grasping or grip device 18 of the telephone 12. As illustrated in the FIG., the user is able to position the telephone 12 so that the speaker and microphone are simultaneously disposed proximate to his mouth and ear, respectively, thereby providing efficient and effective communication. It is also shown in the FIG. that the wrist 15 of the user 10 is maintained in a generally straight orientation and is not bent or rotated. The wrist is maintained in the neutral position, and, therefore, in a more relaxed and non-stressful position.

Figure 3:
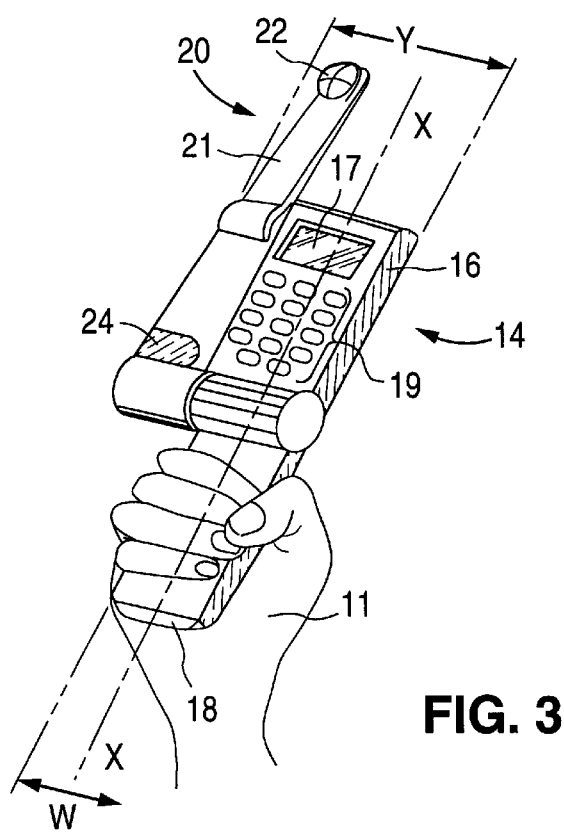
FIG. 3 schematically depicts a hand of a user grasping a wireless telephone having an embodiment of the present invention.

It is believed that the biomechanical stresses caused by wireless telephones of the prior art, are not experienced by a user of a wireless telephone having an embodiment of the present invention because the grasping means or grasping device allows a user to fully grab a portion of the wireless telephone yet still operate it efficiently and effectively. That is, the inventors of the present invention believe that the grasping means or grasping device of the present invention allows the fingers of a user's hand to fully encircle a portion of the wireless phone while not covering the microphone or speaker, obscuring the display, or inadvertently engaging a key of the keypad. Referring now to FIG. 3, which schematically depicts a hand of a user grasping a wireless telephone having an embodiment of the present invention. A user 10 can fully grasp a portion of the wireless telephone 14 without blocking or covering interface devices, such as the microphone 24, the speaker 22, the display 17, or without engaging and operating the input and function keys 19. More specifically, a longitudinal axis of the grasping means or grasping device 18 is aligned parallel to a longitudinal axis X—X of the wireless telephone 14. Also, the grasping means or grasping device 18 has a width W that is less than the width Y of the wireless telephone 14, and the grasping means or device 18 does not have any interface devices such as microphones, speakers, displays, or function/input keys disposed thereon. Since the hand 11 of the user of the wireless telephone 14 can fully encircle the grasping means or grasping device 18, the wireless telephone 14 may be rotated in the hand 11 of the user about the axis X—X to allow the speaker 22 and the microphone 24 to be simultaneously disposed proximate to the mouth and ear of the user, respectively, while maintaining the user's wrist in the neutral position. In contrast, when using a wireless telephone of the prior art a user must grasp the telephone along its edges so as to not block, cover, or engage interface devices such as the keypad, display, speaker, or microphone. When used in this manner, the hand of the user cannot fully encircle the telephone and the telephone cannot be rotated in the user's hand. Therefore, when using such a wireless telephone as a telephone, i.e., simultaneously disposing proximate to the mouth and ear of the user, respectively, the speaker and the microphone of the telephone, the user must hold the telephone in such a manner so as to urge his wrist out of the neutral position and to rotate it backward into an awkward and stressful position.

Figure 4:
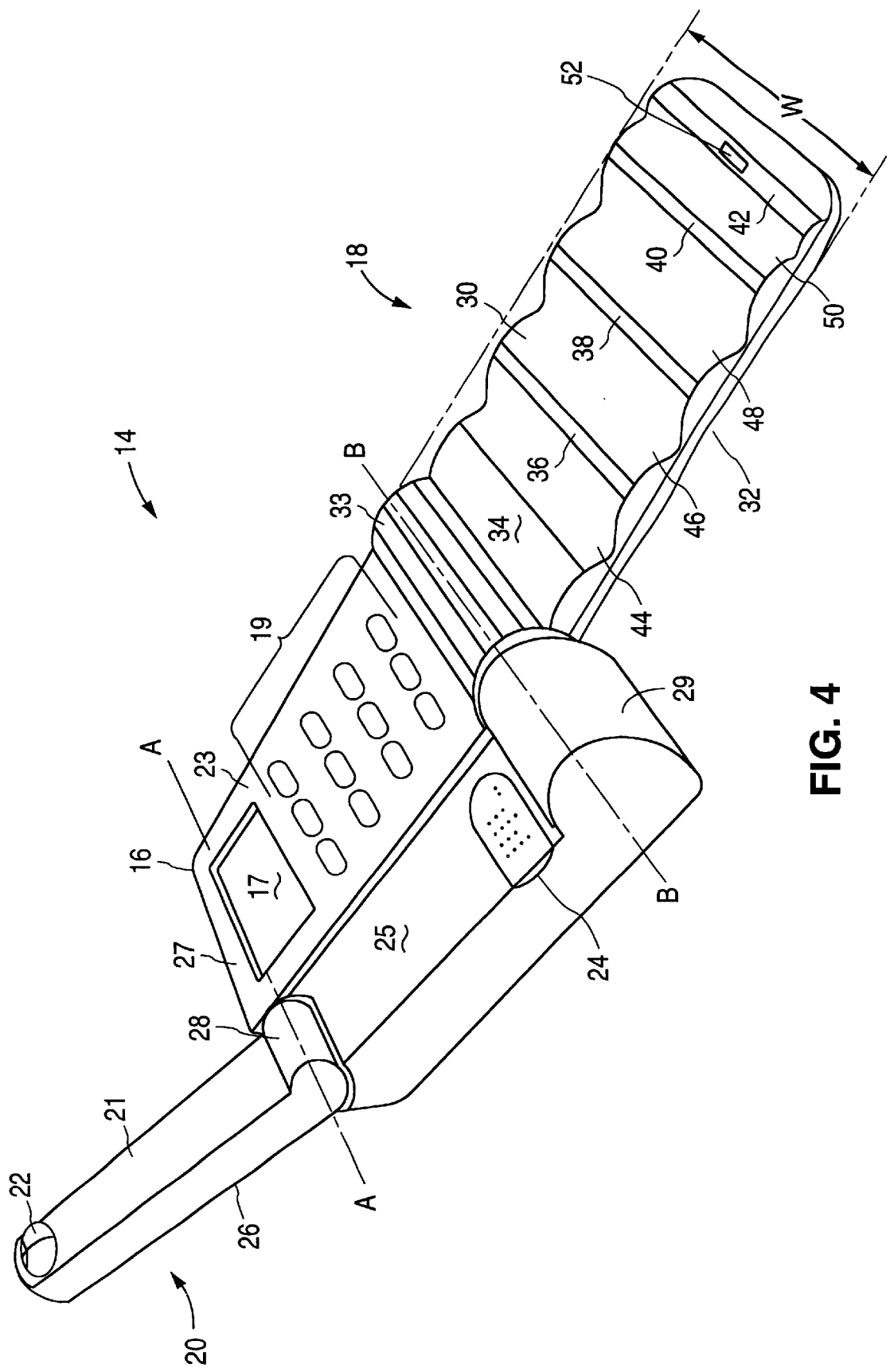
FIG. 4 shows a perspective view from the front of a wireless telephone having an embodiment of the present invention.

FIG. 4 depicts a perspective view from the front of a wireless telephone having an embodiment of the present invention. The telephone 14 includes a main body 16, a speaker assembly 20, and a rotatable grasping means or grasping device 18. A plurality of interface devices are provided for the telephone 14, including a display 17, a plurality of input/function keys or a keypad 19, a speaker 22, and a microphone 24. The main body 16 includes a surface 23, a surface 25, a stationary portion 27, and a stationary portion 29. The display 17 and the keypad 19 are disposed on the surface 23, and the microphone is disposed on the surface 25. As is more clearly illustrated in FIG. 5, the surfaces 23 and 25 are not coplanar, but are offset by an distance C.

The speaker assembly 20 includes an outer surface 26, and an elongated boom portion 21 having the speaker 22 disposed at one end thereof. The opposite end of the boom portion 21 is terminated in a swivel portion 28 which is mechanically coupled to the stationary portion 27 of the main body 16, and is rotatable about an axis A—A. The length of the boom portion 21 is such that when the boom portion 21 is rotated in a clockwise manner about the axis A—A, the speaker 22 of the speaker assembly 20 is received in a concave surface of the microphone 24.

The grasping means or grip device 18 includes an inner surface 30 and an outer surface 32. The outer surface 32 is generally convex so as to more easily conform to the palm of a user's hand. The inner surface 30 includes a plurality of flat portions 34, 36, 38, 40, and 42, and a plurality of concave portions 44, 46, 48, and 50. The flat and concave portions extend the width W of the grasping means or grasping device 18 and are disposed in alternating fashion to form the inner surface 30 thereby forming a form-fitting grasping surface for the fingers of a user's hand. A tab 52 is disposed at one end of the grasping means or grasping device 18 on the flat portion 42 of the inner surface 30. The opposite end of the grasping means or grasping device 18 is terminated in a swivel portion 33 which is mechanically coupled to the stationary portion 29 of the main body 16, and is rotatable about an axis B—B.

Figure 5:
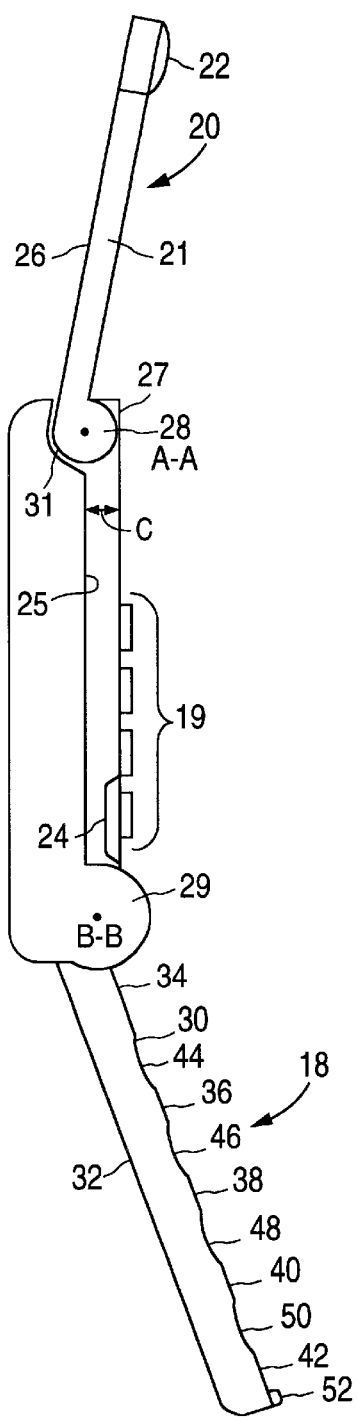
FIG. 5 illustrates a left side view of the wireless telephone of FIG. 4.
Figure 6:
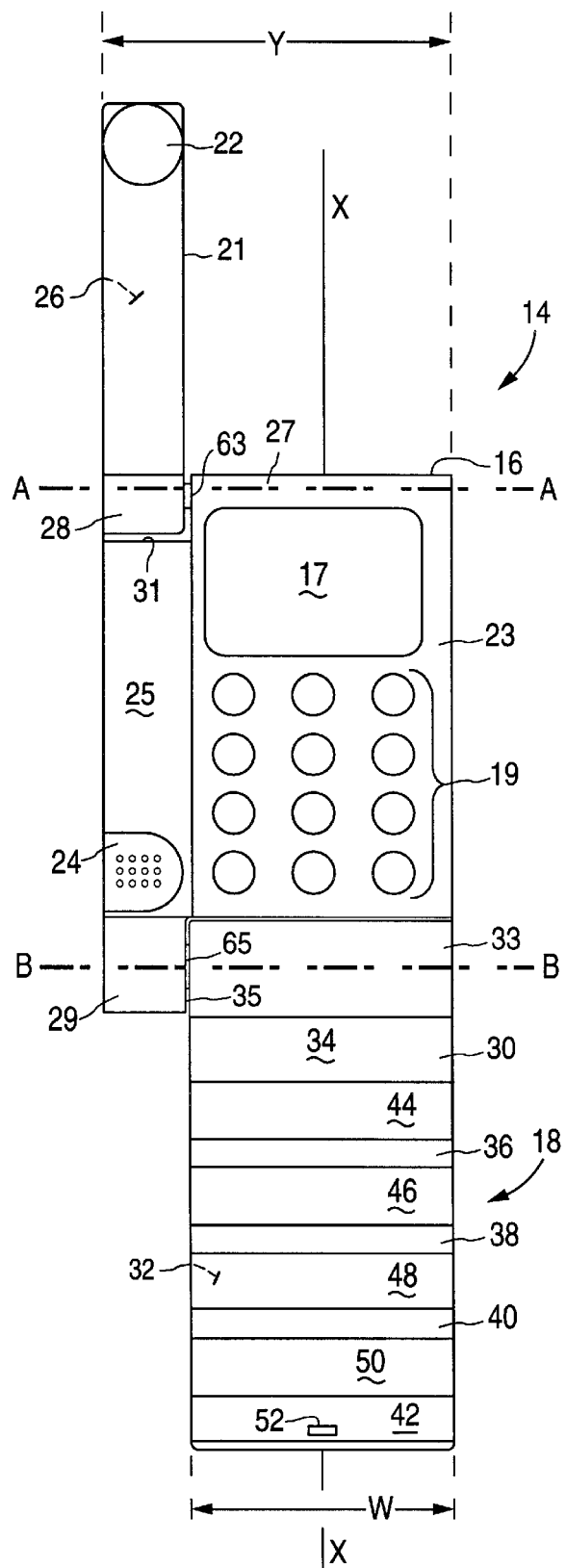
FIG. 6 depicts a front view of the wireless telephone of FIG. 3.

FIGS. 5 and 6 illustrate a left side view and a front view, respectively, of the telephone 14 depicted in FIG. 4. Referring to FIGS. 5 and 6 together, the swivel portion 28 of the speaker assembly 20 is rotatably coupled via a shaft 63 to the non-rotating stationary portion 27 of the main body 16. A clearance space 31 is formed between the swivel portion 28 and the main body 18 and the stationary portion 27 so as to permit the swivel portion 28 and the speaker assembly 20 to rotate about the axis A—A. When the telephone 14 is placed in the operational configuration, the speaker assembly 20 is rotated counterclockwise about the axis A—A and into the position depicted in FIG. 5. When the telephone 14 is placed in the storage configuration, the speaker assembly 20 is rotated clockwise about the axis A—A such that the boom portion 21 is brought into engagement with the surface 25, and the speaker 22 is received within the concave surface of the microphone 24.

The grasping means or grip device 18 is rotatably coupled via a shaft 65 to the non-rotating stationary portion 29 of the main body 16. A clearance space 35 is formed between the swivel portion 33 and the main body 16 and the stationary portion 29 so as to permit the swivel portion 33 and the grasping device 18 to rotate about the axis B—B. When the telephone 14 is placed in the operational configuration, the grasping means or grasping device 18 is rotated clockwise about the B—B axis and into the position depicted in FIG. 5. When the telephone 14 is placed in the storage configuration, the device 18 is rotating counter-clockwise about the axis B—B such that, as more clearly depicted in FIG. 8, the tab 52 is engaged with the surface 23 of the main body 16.

Figure 7:
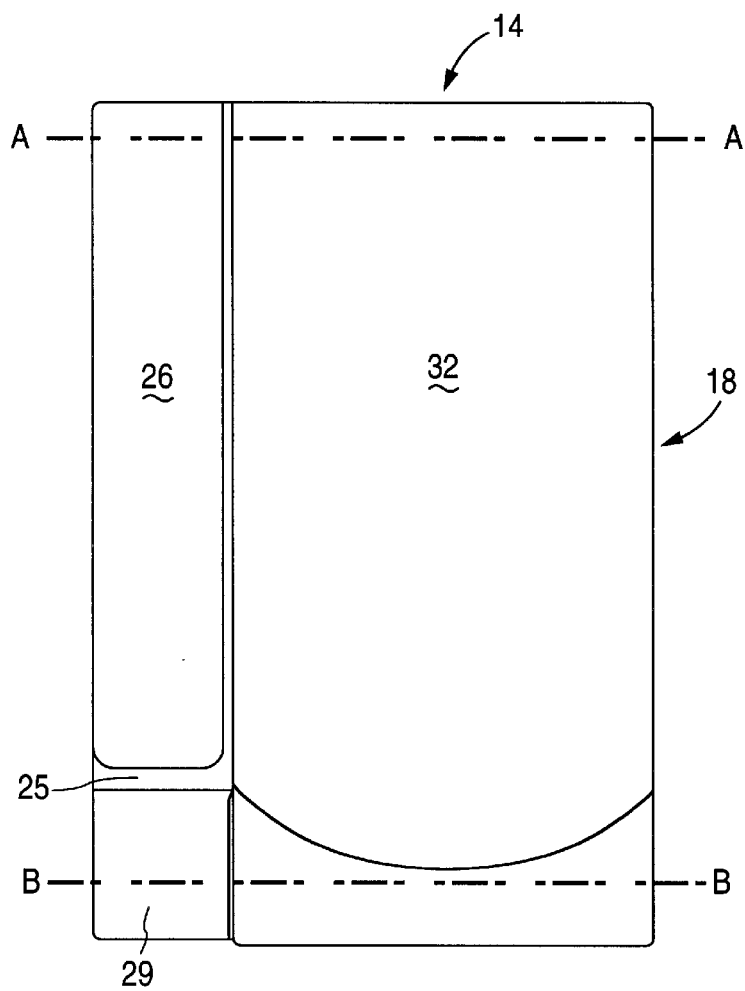
FIG. 7 illustrates a front view of the wireless telephone of FIG. 3 in the storage configuration.
Figure 8:
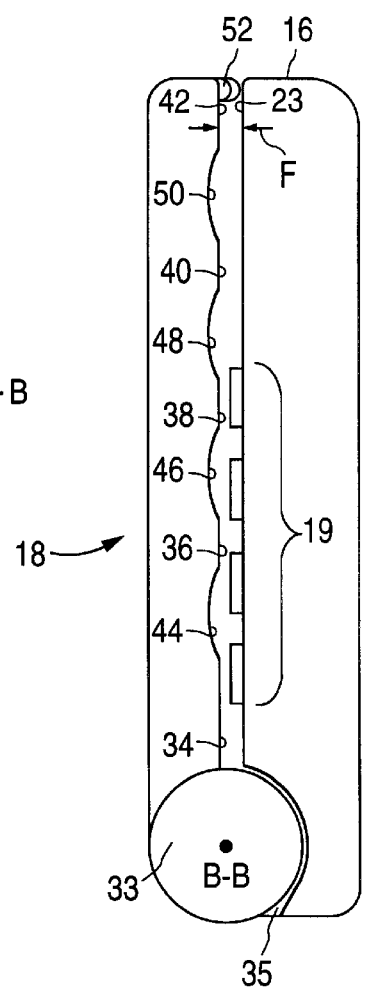
FIG. 8 depicts a right side view of the wireless telephone of FIG. 3 in the storage configuration.

FIGS. 7 and 8 respectively illustrate a front view and a right side view, of the wireless telephone 14 in the storage configuration. Referring to FIGS. 7 and 8 together, when the telephone 14 is placed in the storage configuration, the grasping means or grasping device 18 is rotated clockwise about the axis B—B such that the tab 52 is brought into engagement with the surface 23 of the main body 16. A clearance space having a height F, is formed between the surface 23 and the flat portions 34, 36, 38, 40, and 42 such that the flat portions 34, 36, 38, 40, and 42 are not engaged with the input/function keys 19, thereby not operating the telephone 14. Similarly, when the telephone 14 is placed in the storage configuration, the speaker assembly 20 is rotated clockwise about the axis A—A such that the boom portion 21 is brought into engagement with the surface 25, and the protrusion of the speaker (not shown) is received within the concave surface of the microphone (not shown). The offset distance C between the surfaces 23 and 25 (FIG. 5) is such that when the telephone 14 is rotated into the storage configuration and the boom portion 21 of the speaker assembly 20 is brought into engagement with the surface 25 of the main body 16, the outer surface 26 of the speaker assembly 20 and the outer surface 32 of the grasping means or grasping device 18 presents a smooth external form for the telephone 14 such that it can be easily slid into a coat or shirt of a user.

When a wireless telephone is used as a telephone, a user's mouth and ear must be simultaneously disposed proximate to the microphone and speaker of the wireless telephone, respectively. The grasping means or grasping device 18 of the wireless telephone 14 is sized wide enough and is oriented with respect to the telephone 14, in such a manner so as to permit a user to operate the telephone 14 as a telephone while maintaining his wrist in the neutral position. That is, a wireless telephone having an embodiment of the present invention, can be used as a telephone while maintaining the user's wrist in the neutral position. The longitudinal axis of the grasping means or grasping device is parallel to the longitudinal axis of the telephone. Also, the width of the grasping means or grasping device is narrower than the width of the telephone such that the fingers of a user's hand can completely encircle and grasp a portion of the telephone 14, and the grasping means or device does not have any interface devices such as a keypad, a display, a speaker or a microphone disposed thereon. The fingers of a grasping hand of a user can completely encircle a portion of the wireless telephone without obscuring, blocking, or inadvertently engaging any of the aforementioned interface devices. The wireless telephone can be rotated about the longitudinal axis of the grasping means or grasping device which is aligned parallel to the longitudinal axis of the telephone, to simultaneously dispose the speaker and microphone proximate to the ear and mouth of the user, respectively, while maintaining the wrist of the grasping hand in the neutral position. When using telephones, keyboards and the like, it is highly desirable to maintain one's wrists in the neutral position so as to relieve stress and tension in one's arms and wrists, thereby reducing fatigue and avoiding physical injury. When the arms of a user are dangled straight down by his side, the user's wrists are straight and disposed in the so called "neutral" position.

In contrast, the fingers of a user's grasping hand cannot completely encircle a wireless telephone of the prior art without engaging, blocking or covering interface devices such as a keypad, a speaker, or a microphone. A user of such a prior art wireless telephone, in order to dispose simultaneously proximate to his ear and mouth the speaker and microphone, respectively, must urge the wrist of his grasping hand out of the neutral position and rotate the wrist backward into an awkward and uncomfortable position that stresses and fatigues muscles in his arm, hand and wrist.

In alternate embodiments of the present invention, alternate means of mechanically coupling the grasping means to the main body of the cellular telephone may be utilized. In one alternate embodiment, for example, the grasping means is extendable from a cavity formed in the main body of the cellular telephone. In this manner, when the cellular telephone is placed in the operational configuration the grasping means extends beyond the main body into a position to facilitate grasping by a user. In other alternate embodiments of the present invention, alternate cross-section shapes of the grasping means are contemplated. In such alternate embodiments, for example, the cross-section shape of the grasping means may be square, oval, or cylindrical.

Thus, it is apparent that in accordance with the present invention, a preferred embodiment and alternate embodiments that fully satisfy the objectives and advantages are set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A wireless telephone comprising:

a main body;

a plurality of interface devices disposed on a first surface of said main body; and grasping means attached to said main body, and having a second surface that is situated on the same side as said first surface of said main body when said grasping means is positioned to be held by a user, said grasping means having protuberances on said second surface to engage the fingers of said user.

2. The wireless telephone as recited in claim 1 wherein said plurality of interface devices includes a keypad, a speaker, a display, and a microphone.

3. The wireless telephone as recited in claim 2 wherein said grasping means is rotatably connected to said main body.

4. The wireless telephone as recited in claim 1 wherein said grasping means includes a plurality of alternately disposed flat and concave portions on said second surface.

5. The wireless telephone of claim 1 wherein the width of said grasping means is narrower than the corresponding width of said main body.

6. A wireless telephone comprising:

a main body having a generally rectangular shape, and having a first surface, said first surface having disposed thereon a plurality of input data entry keys, a visual display, a plurality of function entry keys, and a microphone;

a speaker mechanically coupled to said main body;

grasping means coupled to said main body, said grasping means having a second surface that is situated on the same side as said first surface of said main body when said grasping means is positioned to be held by a user, said second surface having an undulating surface including a plurality of alternately disposed flat and concave portions.

7. The wireless telephone of claim 6 wherein the width of said grasping means is narrower than the corresponding width of said main body.

8. A grasping device attached to a wireless telephone having a plurality of interface devices on a first surface, comprising:

grasping means for grasping said wireless telephone such that a wrist of a user of said wireless telephone, is maintained in a neutral position while said wireless telephone is operated as a telephone, said grasping means including protuberances on a predetermined side, said predetermined side being situated on the same side as said first surface of said wireless telephone when said grasping device is positioned to be held by a user.

9. The grasping device attached to a wireless telephone as recited in claim 8, wherein the width of said grasping means is narrower than the width of said wireless telephone.

10. The grasping device as recited in claim 9 wherein said grasping means is rotatably connected to a main body of said wireless telephone.

11. The grasping device as recited in claim 10 wherein said grasping means includes a plurality of alternately disposed flat and concave portions on said predetermined side.

12. A wireless telephone device comprising:

means for housing electronic circuitry for said wireless telephone device;

means for inputting data into said wireless telephone device;

means for receiving information from said wireless telephone device;

means for orally and audibly interacting with said wireless telephone device, said interacting means being disposed on a first surface of said housing means; and means for grasping said wireless telephone device such that a wrist of a user of said wireless telephone, is maintained in a neutral position while said wireless telephone is operated as a telephone, said grasping means having a second surface with protuberances that is situated on the same side as said first surface of said housing means when said grasping means is positioned to be held by said user.

13. The wireless telephone as recited in claim 12, wherein the width of said means for grasping is narrower than the width of said wireless telephone.

14. The wireless telephone as recited in claim 13, wherein said means for grasping is rotatably connected to a main body of said wireless telephone.

15. The wireless telephone as recited in claim 13 wherein said means for grasping includes a plurality of alternately disposed flat and concave portions on said second surface.

* * * * *